United States Patent Office 3,428,767
Patented Feb. 18, 1969

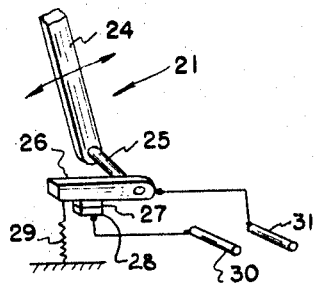
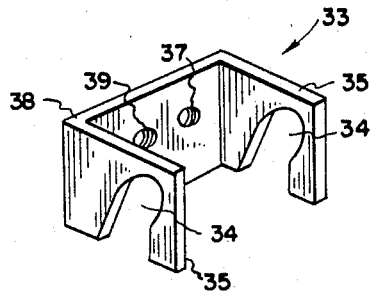
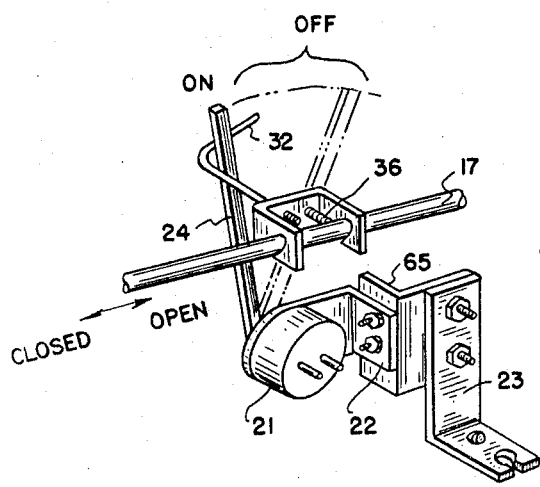

3,428,767
AUTOMOTIVE WARNING SWITCH
Donald C. Pfeifer, Westland, Mich., assignor to Perfection Automotive Products Corporation, Detroit, Mich.
Filed Feb. 23, 1967, Ser. No. 617,876
U.S. Cl. 200—61.89                6 Claims
Int. Cl. H01h 3/14

ABSTRACT OF THE DISCLOSURE

An automotive vehicle warning light switch mechanism for automatically actuating the rear lights when the accelerator pedal is not depressed, including a switch, mounted near the throttle control rod, operated by a swingable lever which is contacted and moved by an arm mounted upon the throttle control rod, with the arm and the switch mounting means being adapted to permit mounting upon any type of conventional vehicle engine.

---

Various devices have been provided, in the past, to operate an early warning signal, which operates before the application of the vehicle brakes, to actuate either the conventional vehicle brake lights or a supplemental light system upon release of the accelerator pedal. Such light signals that the vehicle is slowing down.

Prior art means for actuating such warning signals have not been usable on all styles and types of automotive vehicles, hence, requiring different apparatus for differing vehicles.

Thus, an object of this invention is to provide a single signal control mechanism, operated by movement of the accelerator throttle rod, which is universally adaptable for mounting upon any type of throttle linkage and within any type of conventional engine compartment configuration, and which may be easily mounted and adjusted by unskilled labor.

The invention contemplates using a rotary actuating switch, having a rotatable control lever, which is engaged by an actuating arm, mountable anywhere along a reciprocating throttle linkage rod, with the switch mounted either upon the top of the engine or upon the engine compartment firewall.

These and other objects and advantages of this invention will become apparent upon reading the following description, of which the attached drawings form a part.

In these drawings:

FIG. 3 is a fragmentary, schematic view of the internal construction of the switch.

FIG. 4 is an enlarged perspective view of the actuator arm bracket.

FIG. 5 is a perspective view of a modified switch mounting bracket.

Figure 1:
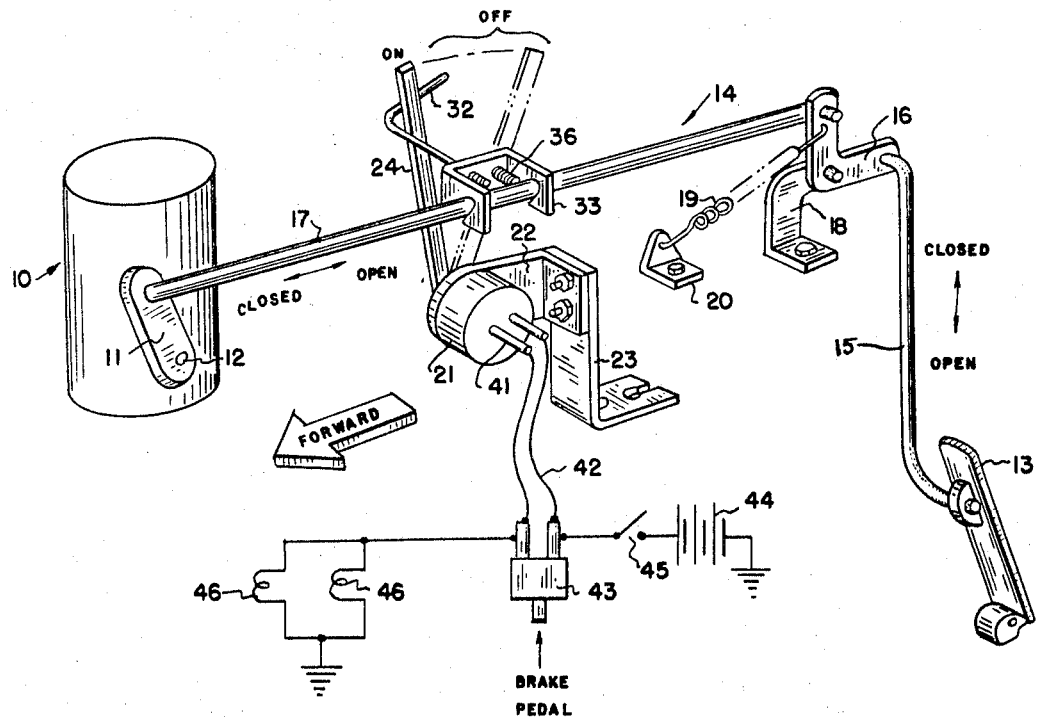
FIG. 1 is a perspective view of the warning switch system applied to one conventional type of throttle linkage.

FIG. 1 schematically illustrates a conventional carburetor 10, having a throttle lever 11 connected to a throttle shaft 12. The lever is connected to the automotive accelerator pedal 13 by means of a throttle linkage 14 which includes a pedal rod 15, a bell crank 16 and throttle rod 17. The bell crank 16 is mounted upon a bracket 18 which may be fastened to the upper portion of the engine. In addition, a coil spring 19 is connected at one end to the bell crank and at its opposite end to a fixed bracket 20 for applying a spring biasing force which normally tends to bias the linkage towards a throttle closed position.

The foregoing is conventional and the invention herein relates to the switch mechanism described below.

The switch mechanism includes a rotary type switch 21 having an angle bracket 22 for securement to a suitable mounting bracket 23 which may be fastened to the upper part of the engine or manifold construction.

The switch is actuated by a pivotally mounted lever 24 fastened to a rotatable axle 25 (see FIG. 3), attached to a contact arm 26 which carries a contactor 27 normally closed against a fixed contactor 28 by means of a closure spring 29. External connector pins 30 and 31 are wired to each of such contactors. This switch is normally closed and opens only when the lever 24 is pivoted to thereby separate the contactors 27 and 28.

The switch lever 24 is moved by an actuator arm 32 which is fastened to the throttle rod by a bracket 33. Such bracket has two slots 34 formed in its legs 35 to closely receive the throttle rod 17, which is locked within the bracket by a set screw 36 threadedly engaged within the threaded hole 37 formed in the base 38 of the bracket (see FIG. 4). A threaded opening 39 receives the threaded end of the actuating arm for thereby fastening the arm and bracket together.

The bracket may be adjustably secured to any part of a throttle rod at any radial angle, to thereby permit locating the switch 21 anywhere so long as its lever can be contacted by the actuator arm.

The external connections 30 and 31 of switch 32 are connected by suitable plugs 41 and wires 42 to the conventional brake pedal switch 43.

The brake pedal light circuit (see FIG. 1), broadly consists of the battery 44, ignition switch 45, brake pedal switch 43 and rear stop lights 46. Hence, connecting the warning switch 21 in parallel with the brake pedal switch 43, permits the circuit to be operated, to turn on the lights 46, despite the brake pedal switch not being depressed.

Alternatively, a separate set of warning lights could be installed in the vehicle and operated by the warning switch 21.

Since the switch lever 24 is normally spring urged towards the carburetor or throttle closed position, it tends to move the throttle linkage 14 in a direction which elevates the accelerator pedal 13. Hence, it functions to prevent the accelerator pedal from "sticking," that is, from not rising when released.

In operation, when the drivers of the vehicle depresses accelerator pedal 13, throttle rod 17 moves to the right, thereby moving lever 24 to open or separate contactors 27 and 28, thereby opening the light circuit and turning off the lights 46. Conversely, when the driver releases the accelerator pedal, the throttle rod 17 moves to the left, as does the lever 24, thereby closing the contactors 27 and 28 to actuate the lights 46. Since the stop lights turn on before operating the brakes, they provide a fast warning to following vehicles. Meanwhile, the rear lights continue to be separately operated by the brake pedal and brake pedal switch 43.

Figure 2:
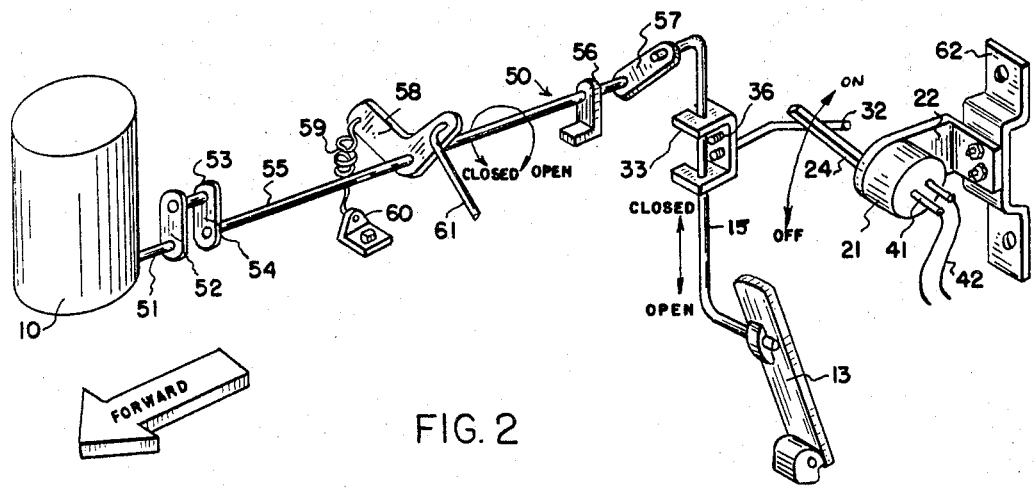
FIG. 2 illustrates, in perspective, the warning switch system applied to a second conventional type of throttle linkage.

Modification of FIG. 2

FIG. 2 illustrates a different type of throttle linkage in which the carburetor 10 is connected to the accelerator pedal 13 through a conventional rotary type throttle linkage 50. In this arrangement, the throttle shaft 51 is longitudinal of the vehicle, as compared to transversely. The throttle shaft 51 carries the throttle lever 52 which is coupled by a pin 53 and throttle rod link 54 to the throttle rod shaft 55. The shaft passes through a support bracket 56 and is connected to a rear link 57, in turn connected to the pedal rod 15.

In this arrangement, it is common to provide a bell crank 58 mounted on the rod 55 and biased by a spring 59 connected to a fixed bracket 60, which the opposite end of the bell crank attached to a linkage 61 adapted for connection to the throttle valve portion of an automatic transmission.

Since the throttle shaft 51 and throttle rod 55 are coaxially arranged so that the throttle rod is rotated, rather than reciprocated, the pedal rod 15 is used to carry the bracket 33 with its actuating arm 32. Thus, the switch 21 is mounted by means of a suitable bracket 62 to the firewall of the engine compartment.

The only differences between the switch arrangement of the modification of FIG. 1 and the modification of FIG. 2 are the locations of the switch and actuating arm bracket and the use of a differently shaped bracket for mounting the switch either on top of the engine or upon the firewall.

*Modification of FIG. 5*

FIG. 5 illustrates a modification similar to FIG. 1, with the exception that an adapter bracket 65 is provided between the switch bracket 22 and the switch mounting bracket 23. Since the adapter 65 and the bracket 23 may be reversely connected, this bracket arrangement makes it possible to secure the switch to a wide variety of mounting surfaces which may be found upon the upper portions of conventional automotive engines.

This invention may be further developed within the scope of the following claims. Accordingly, the foregoing description should be considered as illustrative of an operative embodiment of the invention, rather than in a strictly limited sense.

I now claim:

1. In an automotive vehicle warning light system of the type characterized by a normally closed warning switch mechanically cooperating with the accelerator pedal and throttle linkage and electrically connected in the vehicle rear light circuit so as to automatically turn these lights on whenever the accelerator pedal is in its closed throttle position and to immediately open this light circuit as soon as the accelerator pedal is depressed, the improved construction which comprises:

a bracket mounted upon a portion of a vehicle, a rotary type warning switch mounted through said bracket, said switch including a rotary lever secured to a rotary switch arm biased to the closed circuit position, said switch being so mounted as to position said lever adjacent a reciprocating portion of the throttle linkage;

a bracket and actuating arm assembly secured to and adjustably positioned on said reciprocating portion of the throttle linkage at a point in close proximity to said lever so that said actuating arm abuts said lever in the closed throttle position of the throttle linkage and closed position of said switch, and whereby said actuating arm rotates said lever and said switch arm to open said switch as the throttle linkage moves into an open throttle position.

2. The warning light system of claim 1 wherein said switch is secured to a portion of the engine through an angle bracket.

3. The warning light system of claim 1 wherein said switch is secured to a portion of the engine through a pair of cooperating angle brackets, said switch being mounted on the first of said angle brackets, and the second of said angle brackets being mounted to the engine and on said first angle bracket.

4. The warning light system of claim 1 wherein said switch is mounted on the engine compartment firewall.

5. The warning light system of claim 1 wherein said switch and follower lever are arranged so that the internal bias of the switch aids in maintaining the throttle in closed condition.

6. The warning light system of claim 1 wherein said bracket of said assembly is U-shaped, with each of the parallel legs of said bracket being provided with a slot open at one end and directed at right angles to the plane of the U, to permit said bracket to be slipped onto said reciprocating portion of the throttle linkage at any point therealong, the base leg of said bracket having a first threaded hole to receive a clamping set screw and a second threaded hole to receive said actuating arm.

References Cited

UNITED STATES PATENTS

| | | | |
|---|---|---|---|
| 2,734,105 | 2/1956 | Perry | 200—61.89 |
| 2,853,572 | 9/1958 | Breeze | 200—61.89 |
| 3,103,561 | 9/1963 | Chesler | 200—61.89 |

ROBERT K. SCHAEFER, *Primary Examiner.*

M. GINSBURG, *Assistant Examiner.*

U.S. Cl. X.R.

340—71